(12) United States Patent
Demund et al.

(10) Patent No.: US 10,957,952 B2
(45) Date of Patent: Mar. 23, 2021

(54) HEATABLE BATTERY

(71) Applicant: Bayerische Motoren Werke Aktiengesellschaft, Munich (DE)

(72) Inventors: Alexander Demund, Landshut (DE); Christoph Bauer, Munich (DE); Thomas Hammerschmidt, Unterschleissheim (DE); Jan Philipp Schmidt, Munich (DE); Christian Luther, Gilching (DE); Matthias Frahm, Munich (DE); Edwin Knobbe, Pfaffenhofen an der Ilm (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 118 days.

(21) Appl. No.: 16/183,193

(22) Filed: Nov. 7, 2018

(65) Prior Publication Data
US 2019/0074559 A1   Mar. 7, 2019

Related U.S. Application Data

(63) Continuation of application No. PCT/EP2017/060599, filed on May 4, 2017.

(30) Foreign Application Priority Data

May 11, 2016  (DE) ...................... 10 2016 208 063.6

(51) Int. Cl.
*H01M 10/637*   (2014.01)
*H01M 10/615*   (2014.01)
(Continued)

(52) U.S. Cl.
CPC ....... *H01M 10/637* (2015.04); *H01M 2/1077* (2013.01); *H01M 10/4257* (2013.01);
(Continued)

(58) Field of Classification Search
CPC ............. H01M 10/637; H01M 10/647; H01M 10/4257; H01M 10/654; H01M 10/625;
(Continued)

(56) References Cited

U.S. PATENT DOCUMENTS

| 2012/0133329 A1 | 5/2012 | Yoshida et al. |
| 2014/0113166 A1 | 4/2014 | Schneider et al. |

FOREIGN PATENT DOCUMENTS

| CN | 102474122 A | 5/2012 |
| DE | 10 2012 210 146 A1 | 12/2013 |

(Continued)

OTHER PUBLICATIONS

Machine translation of DE 102014012067 (cited on the IDS) (Year: 2016).*

(Continued)

*Primary Examiner* — Eugenia Wang
(74) *Attorney, Agent, or Firm* — Crowell & Moring LLP (57) ABSTRACT

A heatable battery includes a battery cell with an anode, a cathode, an anode connection which is connected to the anode, and a cathode connection which is connected to the cathode. The battery cell has a heating element and a connection for applying a voltage potential to the heating element. The heating element is connected to one of the components of the anode connection and the cathode connection. The battery cell further has a controllable switch which is arranged between the connection for applying the voltage potential to the heating element and the other of the components of the anode connection and the cathode connection.

10 Claims, 4 Drawing Sheets

(51) Int. Cl.
    *H01M 10/6571*     (2014.01)
    *H01M 10/625*     (2014.01)
    *H01M 2/10*     (2006.01)
    *H01M 10/654*     (2014.01)
    *H01M 10/42*     (2006.01)
    *H01M 10/647*     (2014.01)
    *H01M 2/30*     (2006.01)

(52) U.S. Cl.
    CPC ....... *H01M 10/615* (2015.04); *H01M 10/625* (2015.04); *H01M 10/647* (2015.04); *H01M 10/654* (2015.04); *H01M 10/6571* (2015.04); *H01M 2/30* (2013.01); *H01M 2220/20* (2013.01)

(58) Field of Classification Search
    CPC ........... H01M 10/6571; H01M 10/615; H01M 2/1077; H01M 2/30; H01M 2220/20
    See application file for complete search history.

(56) References Cited

FOREIGN PATENT DOCUMENTS

DE     10 2012 219 082 A1     4/2014
DE     10 2014 012 067 A1     2/2016

OTHER PUBLICATIONS

Machine translation of DE 102012210146 (cited on the IDS) (Year: 2013).*
International Search Report (PCT/ISA/210) issued in PCT Application No. PCT/EP2017/060599 dated Jun. 9, 2017 with English translation (four (4) pages).
German-language Search Report issued in counterpart German Application No. 102016208063.6 dated Feb. 23, 2017 with partial English translation (11 pages).
Chinese-language Office Action issued in Chinese Application No. 201780010162.5 dated Sep. 2, 2020 with English translation (16 pages).

* cited by examiner

HEATABLE BATTERY

CROSS REFERENCE TO RELATED APPLICATIONS

This application is a continuation of PCT International Application No. PCT/EP2017/060599, filed May 4, 2017, which claims priority under 35 U.S.C. § 119 from German Patent Application No. 10 2016 208 063.6, filed May 11, 2016, the entire disclosures of which are herein expressly incorporated by reference.

BACKGROUND AND SUMMARY OF THE INVENTION

The invention relates to a heatable battery, which can be used, for example, as a vehicle battery.

A battery conventionally comprises a plurality of individual galvanic cells, the so-called battery cells. In order to construct a battery from the battery cells, the individual battery cells can be electrically connected in series.

Modern generations of drive batteries in vehicles, for example electric vehicles, exhibit temperature-dependent fluctuations in their power. Large power losses of the battery cells, which losses are caused by the internal resistance of the battery cells that is increased as a result of temperature, can often be identified, in particular at very low temperatures, for example temperatures lower than 0° C. This leads to a reduced power of the battery, which is thus also available for the vehicle to only a reduced extent, and indirectly to a reduced amount of energy that can be drawn on account of overpotentials.

An objective of the present invention is to provide a heatable battery, which has the simplest possible interconnection of the components thereof for the purpose of heating the battery.

One embodiment of a heatable battery comprises a battery cell. The battery cell has an anode and a cathode, an anode terminal, which is connected to the anode, and a cathode terminal, which is connected to the cathode. The battery cell furthermore has a heating element and a terminal for applying a voltage potential to the heating element. The heating element is connected to one of the anode terminal and the cathode terminal. The battery cell further has a controllable switch, which is arranged between the terminal for applying the voltage potential to the heating element and the other of the anode terminal and the cathode terminal.

In the present battery design, the heating of the cells is actuated directly in a configuration of the heating element. The actuation is carried out here by use of the controllable switch, which is arranged directly between the terminal for applying a voltage potential to the heating element, the so-called high-resistance terminal, and the one of the anode terminal and the cathode terminal.

The controllable switch is closed (turned on) only in the heating-up phase and is turned off in normal operation. When the heating element is connected to the cathode, for example is arranged on the cathode, a current flows in heating operation from the anode terminal via the controllable switch, which is turned on, and the heating element to the cathode terminal. When the heating element is connected to the anode, for example is arranged on the anode, a current flows in heating operation from the anode and the heating element arranged thereon via the controllable switch, which is turned on, to the cathode terminal. The voltage required for the flow of current is generated by the battery cell itself between the anode and cathode terminal. The heating element can be designed, for example, as a surface resistor, which is arranged on the surface of the anode or the cathode. When a current is flowing through the heating element, the heating element heats up, wherein the heat generated is dissipated to the battery.

In the normal operating state, when the temperature of the battery cell is sufficiently high, in order to provide the required voltage for operating a load, the controllable switch is turned off or blocked. In this case, no current flows through the heating element. The battery cell generates a voltage between its anode and cathode terminal, which voltage is required to operate the load arranged between the anode and the cathode terminal.

A battery can include a plurality of battery cells, which are connected to one another in series. In this series circuit, the cathode terminal of a battery cell can be connected to the anode terminal of the adjacent battery cell.

According to one possible embodiment, in a battery construction composed of a plurality of battery cells, each battery cell can be assigned its own controllable switch. The controllable switch is arranged in each battery cell between the terminal of said battery cell for applying a voltage potential to the heating element and the anode or cathode terminal of said battery cell. When the heating element is connected to the cathode, for example is arranged on the cathode, the controllable switch is arranged between the anode terminal and the terminal for applying the voltage potential to the heating element. When the heating element is connected to the anode, for example is arranged on the anode, the controllable switch is arranged between the terminal for applying the voltage potential to the heating element and the cathode terminal. Each battery cell can thus be actuated and heated individually by way of appropriate control of the controllable switch.

According to a further design in which a plurality of battery cells are likewise connected in series with one another by virtue of the cathode terminal of a battery cell being connected to the anode terminal of a further battery cell, only one controllable switch is provided, by way of which one controllable switch all of the heating elements of the individual cells are switched on or off. In a design of this kind, each battery cell has a heating element. In addition to the (first) terminal for applying a (first) voltage potential to the heating element, each battery cell furthermore comprises another further (second) terminal for applying a further, second voltage potential to the heating element.

In a battery design of this kind, the controllable switch can be connected, for example, between one of the anode and cathode terminal of the first battery cell and the first terminal for applying the first voltage potential to the heating element. The further battery cells are interconnected with one another by virtue of the other of the anode and cathode terminal of the first battery cell being connected to one of the anode terminal and the cathode terminal of the further battery cell. The second terminal for applying the second voltage potential to the heating element of the first battery cell is furthermore connected to the first terminal for applying the first voltage potential to the heating element of the adjacent battery cell.

According to a further embodiment of the battery, the terminal for applying the voltage potential to the heating element can be the housing of the battery. In this embodiment, a terminal for applying a voltage potential to the heating element, which terminal is provided separately therefor, is omitted. The heating element is electrically connected to the housing and the controllable switch is likewise connected to the housing as well. The controllable switch is arranged, in particular, between the anode or cathode terminal of a battery cell and the housing. When the heating element is connected to the cathode, a current flows in the on state of the controllable switch from the anode via the closed controllable switch and the housing of the battery cell to the heating element. When the heating element is connected to the anode, a current flows in the on state of the controllable switch from the anode and the heating element via the housing to the controllable switch and from there to the cathode.

The battery is characterized by a low degree of cabling complexity and by reduced demands on the controllable switch with respect to the current-carrying capacity thereof.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
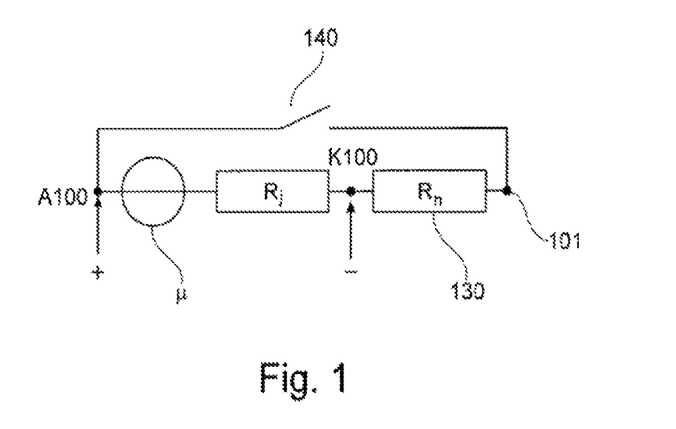
FIG. 1 shows an equivalent circuit diagram of a battery cell of the heatable battery.

FIG. 1 shows an equivalent circuit diagram of a battery cell having an anode terminal A100 and a cathode terminal K100. A voltage source U having an internal resistance $R_j$ is arranged between the anode terminal A100 and the cathode terminal K100. In the charged state, the voltage source U together with the internal resistance $R_j$ arranged in series therewith generates a voltage between the anode terminal A100 and the cathode terminal K100, which voltage is provided by the battery cell for operating a load.

To heat the battery cell, the cell has a heating element 130, which is represented in the equivalent circuit diagram by the resistor $R_h$. The heating element can be designed as a heating resistor, which heats up when a current flows. The battery cell furthermore has a terminal 101 (high-resistance terminal) for applying a voltage potential to the heating element and a controllable switch 140, which is arranged between the anode terminal A100 and the terminal 101 for applying a voltage potential to the heating element 130/the heating resistor $R_h$.

To generate a flow of current through the heating element 130 (heating resistor $R_h$), the controllable switch 140 is switched to the on state. The battery cell itself delivers the voltage required for the flow of current. In the open, off state of the controllable switch, the heating element 130 (heating resistor $R_h$) is deactivated so that the battery cell is not heated up. In this case, there is no flow of current through the heating element 130.

The battery cell including an integrated heating element 130 has low demands on the controllable switch 140 with respect to the current-carrying capacity thereof. The controllable switch merely has to be designed to carry the heating current. A further advantage of the circuit design consists in the fact that, in heating operation, only the controllable switch 140 has to be switched from the open state to the on state and no external load has to be connected in order to generate a flow of current through the heating resistor $R_h$. When the controllable switch is turned on, the circuit that is formed by the voltage source U with the internal resistance $R_j$ and the heating resistor $R_h$ is closed by way of the controllable switch 140.

Figure 2:
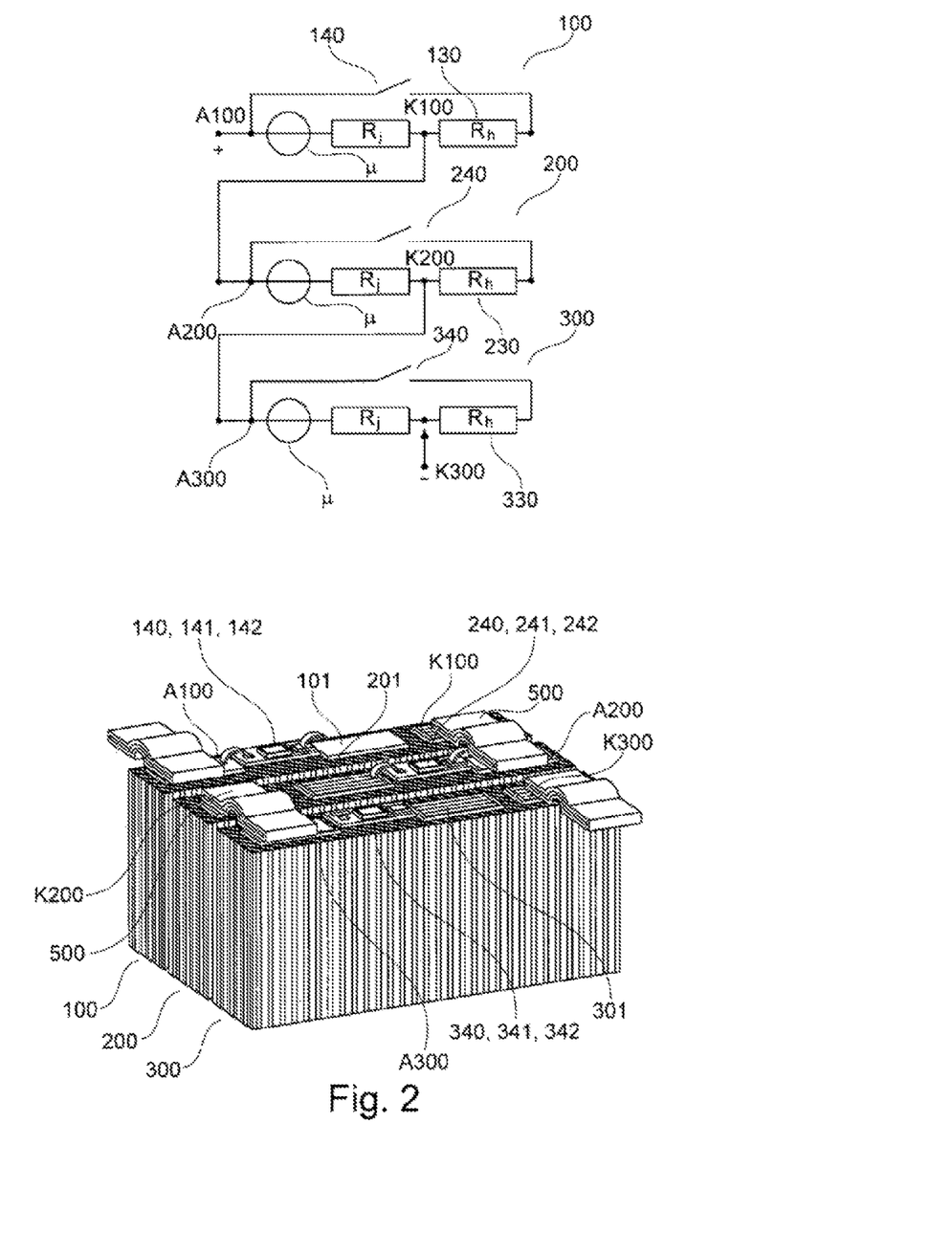
FIG. 2 shows a first embodiment of a heatable battery comprising a plurality of battery cells with individual control of the respective heating element of the battery cells.

FIG. 2 shows an embodiment of a heatable battery 1 composed of a plurality of battery cells 100, 200 and 300. The top part of FIG. 2 shows the equivalent circuit diagram of the heatable battery having three battery cells 100, 200 and 300. The bottom part of FIG. 1 shows a practical embodiment of a heatable battery 1 having three battery cells 100, 200 and 300. Each of the battery cells 100, 200 and 300 has an anode and a cathode inside its cell cover/housing, between which anode and cathode there is an electrolyte. The anode and the cathode are illustrated in detail in FIGS. 3 and 4 inside the cell cover/the housing.

Figure 3:
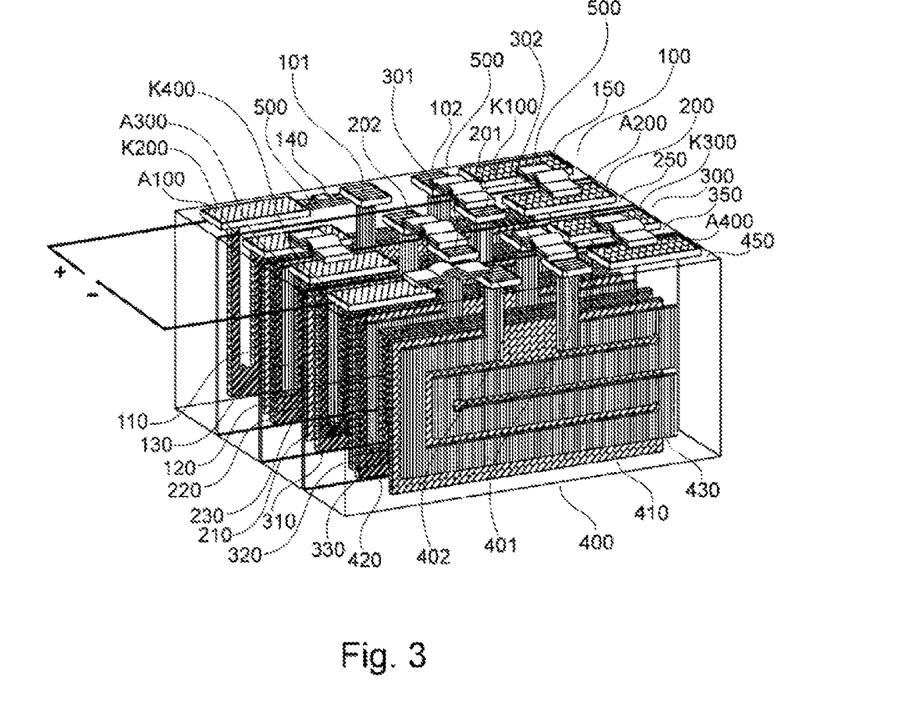
FIG. 3 shows a second embodiment of a heatable battery comprising a plurality of battery cells and joint control of the respective heating elements of the battery cells.

The battery cell 100 has an anode and a cathode, which is illustrated by way of example in FIG. 3 inside the cell 100. The battery cell further has an anode terminal A100, which is connected to the anode in the cell interior, and a cathode terminal K100, which is connected to the cathode arranged in the cell interior. The battery cell 100 furthermore has a heating element 130 and a terminal 101 for applying a voltage potential to the heating element 130. The heating element 130 is arranged between the cathode terminal K100 and the terminal 101 for applying the voltage potential to the heating element 130. The battery cell 100 furthermore has a controllable switch 140, which is arranged between the anode terminal A100 and the terminal 101 for applying the voltage potential to the heating element 130. The equivalent circuit diagram of the battery cell 100 is shown in the top part of FIG. 2. The equivalent circuit diagram corresponds to the equivalent circuit diagram of a battery cell described in FIG. 1.

The battery cell 200 has an anode and a cathode inside its cell cover/housing, which anode and cathode is illustrated in detail in FIG. 3. An anode terminal A200, which is connected to the anode in the cell interior, and a cathode terminal K200, which is connected to the cathode in the cell interior, are arranged on the outer surface of the cell cover. The battery cell 200 furthermore has a heating element 230 and a terminal 201 for applying a voltage potential to the heating element 230. The battery cell 200 furthermore has a controllable switch 240, which is arranged between the anode terminal A200 and the terminal 201 for applying the voltage potential to the heating element 240. The heating element 240 is arranged between the cathode terminal K200 and the terminal 201 for applying the voltage potential to the heating element 240. The equivalent circuit diagram of the battery cell 200 is illustrated on the top part of FIG. 2.

The heatable battery can further have a further battery cell 300, as is shown by way of example in FIG. 3. The further battery cell 300 has an anode and a cathode inside its cell cover/its housing, which anode and cathode are illustrated in detail in FIG. 3. On the outer surface of its cell cover, the further battery cell 300 has an anode terminal A300, which is connected to the anode in the cell interior, and a cathode terminal K300, which is connected to the cathode in the interior of the battery cell 300. The battery cell 300 furthermore has a heating element 330 and a terminal 301 for applying a voltage potential to the heating element 330. The equivalent circuit diagram of the battery cell 300 is illustrated in the top part of FIG. 2.

To construct the battery configuration composed of the three battery cells 100, 200 and 300, the anode terminal A200 of the battery cell 200 is connected to the cathode terminal K100 of the battery cell 100. The anode terminal A300 of the battery cell 300 is connected to the cathode terminal K200 of the battery cell 200. To this end, bridging elements 500 can be provided between the anodes and the cathode terminals.

The equivalent circuit diagrams of the individual battery cells 100, 200 and 300 are embodied as shown in FIG. 1. Said battery cells each have the voltage source U and the internal resistance $R_j$, which are arranged between the respective anode terminal and the respective cathode terminal. The heating element 130 is symbolized by the heating resistor $R_h$.

In the embodiment of a heatable battery illustrated in FIG. 2, the individual battery cells can be heated individually. To this end, the respective controllable switch 140, 240 and 340, respectively, of the respective battery cells 100, 200 and 300 are switched to the on state. The controllable switch of the individual battery cells can be designed, for example, as a MOSFET switch 141, 241, 341 or, for example, as a relay 142, 242, 342 for the purpose of current control. The respective anode terminal, the cathode terminal, the terminal for applying a voltage potential to the heating element and the controllable switch of the respective battery cell can be arranged on an outer surface of a cell cover/housing 150, 250, 350 of the respective battery cell 100, 200 and 300.

FIG. 3 shows a further embodiment of a heatable battery 1, which has, for example, four battery cells 100, 200, 300 and 400. The battery cell 100 has an anode 110 and a cathode 120 inside the cell cover/the housing 150 of said battery cell. The battery cell 100 furthermore has an anode terminal A100, which is connected to the anode 110, and a cathode terminal K100, which is connected to the cathode 120. The battery cell 100 has a heating element 130 and a first terminal 101 for applying a first voltage potential to the heating element 130 and a second terminal 102 for applying a second voltage potential to the heating element 130. The anode terminal A100, the cathode terminal K100 and the first and second terminal 101, 102 for applying the voltage potentials to the heating element 130 are arranged on an outer surface of the cell cover/the housing 150 of the battery cell 100.

The battery cell 200 has an anode 210 and a cathode 220 inside the cell cover/the housing 250 of said battery cell. The battery cell 200 furthermore has an anode terminal A200, which is connected to the anode 210, and a cathode terminal K200, which is connected to the cathode 220. The battery cell 200 furthermore has a heating element 230 and a first terminal 201 for applying a first voltage potential to the heating element 230 and a second terminal 202 for applying a second voltage potential to the heating element 230.

In contrast to the battery cell 100, the battery cell 200 does not have a controllable switch. The battery cell 100 and the battery cell 200 are interconnected with one another in such a way that the cathode terminal K100 of the battery cell 100 is connected to the anode terminal A100 of the further battery cell 200. The second terminal 102 of the battery cell 100 is connected to the first terminal 201 of the battery cell 200. To this end, for example, a bridging element 500 can be arranged between the second terminal 102 of the battery cell 100 and the first terminal 201 of the battery cell 200.

The battery cell 300 has an anode 310 and a cathode 320 inside the cell cover 350 of said battery cell. The battery cell 300 has an anode terminal A300, which is connected to the anode 310, and a cathode terminal K300, which is connected to the cathode 320. The battery cell 300 has a heating element 330 and a first terminal 301 for applying a first voltage potential to the heating element 330 and a second terminal 302 for applying a second voltage potential to the heating element 330.

Like the battery cell 200, the battery cell 300 does not have a controllable switch either. The anode terminal A300 of the battery cell 300 is electrically connected to the cathode terminal K200 of the battery cell 200. The second terminal 202 of the battery cell 200 is connected to the first terminal 301 of the battery cell 300. To this end, for example, a bridging element can be arranged between the second terminal 202 of the battery cell 200 and the first terminal 301 of the battery cell 300. The anode terminal A300, the cathode terminal K300 and the first and second terminal 301, 302 for applying a respective voltage potential to the heating element 330 are arranged on an outer surface of the cell cover/housing 350 of the battery cell 300.

In the exemplary embodiment illustrated in FIG. 3, the heatable battery has a further battery cell 400. The battery cell 400 has an anode 410 and a cathode 420, which are arranged inside the cell cover/the housing 450 of the battery cell 400. The battery cell 400 furthermore has an anode terminal A400, which is connected to the anode 410, and a cathode terminal K400, which is connected to the cathode 420. The battery cell 400 furthermore has a heating element 430 and a first terminal 401 for applying a first voltage potential to the heating element 430 and a second terminal 402 for applying a second voltage potential to the heating element 430.

The cathode terminal K300 of the battery cell 300 is electrically conductively connected to the anode terminal A400 of the battery cell 400. The second terminal 302 of the battery cell 300 is connected to the first terminal 401 of the battery cell 400. To this end, a bridging element can be arranged between the second terminal 302 of the battery cell 300 and the first terminal 401 of the battery cell 400. The second terminal 402 of the battery cell 400 is furthermore electrically conductively connected to the cathode terminal K400 of the battery cell 400. The voltage provided by the battery can be tapped between the anode terminal A100 and the cathode terminal K400.

In the embodiment shown in FIG. 3, the heatable battery has only one controllable switch 140, which is connected between the anode terminal A100 and the first terminal 101 for applying a first voltage potential to the heating element 130. Said controllable switch 140 can be used to activate all of the heating elements 130, 230, 330, 430 of the battery cells of the heatable battery at the same time by virtue of the controllable switch 130 being switched to the on state. In the off state of the controllable switch 130, the individual battery cells are not heated.

Figure 4:
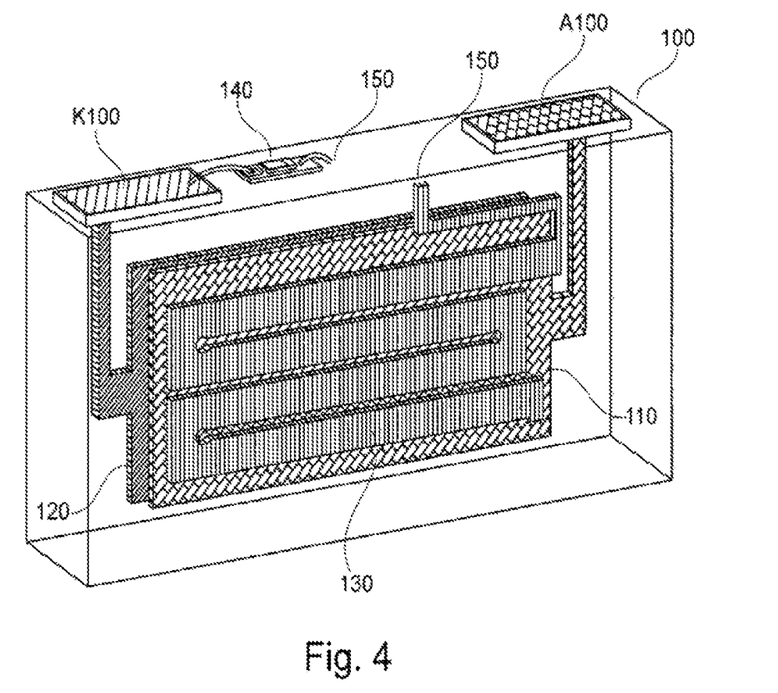
FIG. 4 shows a third embodiment of a heatable battery with the use of a cell cover/housing of a battery cell as a terminal for applying a voltage potential to the heating element.

FIG. 4 shows a further embodiment of a heatable battery 1. For the sake of simplicity, only one battery cell 100 is shown. The battery cell 100 shown in FIG. 4 has an anode 110 and a cathode 120 inside the cell housing 150 of said battery cell. The battery cell 100 furthermore has an anode terminal A100, which is connected to the anode 110, and a cathode terminal K100, which is connected to the cathode 120. The battery cell 100 furthermore has a heating element 130 and a controllable switch 140, which is connected with one side to the cathode terminal K100 and is electrically connected with the other side to the cell housing/cell cover 150.

In the embodiment shown in FIG. 4, the terminal for applying a voltage to the heating element (high-resistance terminal) is not designed as a separate terminal. Instead, the cell housing/cell cover 150 of the battery cell serves as a terminal for applying a voltage potential to the heating element 130. The controllable switch 140 is therefore conductively connected to the cell housing 150. The heating element 130 is likewise conductively connected on one side conductively to the cell housing/cell cover 150.

In all of the embodiments of the heatable battery shown in FIGS. 2 to 4, the heating element 130 is designed as a surface resistor. The surface resistor can be designed as an electrically conductive material web, which is arranged on a surface of the anode or the cathode of the respective battery cell.

FIGS. 2 to 4 show embodiments in which the heating element 130 is arranged on the cathode 110 of the battery cell 100. In accordance with another embodiment, the heating element 130 can also be arranged on the anode 120. In this case, the controllable switch 140 is connected to the anode and cathode terminal other than the one shown in FIGS. 2 to 4.

The various circuit designs of a heatable battery shown in FIGS. 2 to 4 are characterized by a reduced degree of cabling complexity and by a reduced demand on the controllable switch/switches with respect to the current-carrying capacity thereof.

LIST OF REFERENCE DESIGNATIONS

1 Heatable battery
100 Battery cell
A100 Anode terminal
K100 Cathode terminal
110 Anode
120 Cathode
130 Heating element
140 Controllable switch
150 Cell housing
200 Battery cell
A200 Anode terminal
K200 Cathode terminal
210 Anode
220 Cathode
230 Heating element
240 Controllable switch
250 Cell housing
300 Battery cell
A300 Anode terminal
K300 Cathode terminal
310 Anode
320 Cathode
330 Heating element
340 Controllable switch
350 Cell housing
400 Battery cell
A400 Anode terminal
K400 Cathode terminal
410 Anode
420 Cathode
430 Heating element
440 Controllable switch
450 Cell housing The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heatable battery, comprising:
   a battery cell,
   wherein the battery cell has an anode and a cathode, an anode terminal, which is connected to the anode, and a cathode terminal, which is connected to the cathode, a heating element and a terminal for applying a voltage potential to the heating element,
   wherein the heating element is connected to one of the anode terminal and the cathode terminal,
   wherein the battery cell has a controllable switch, which is arranged between the terminal for applying voltage potential to the heating element and the other of the anode terminal and the cathode terminal, and
   wherein the controllable switch has a current carrying capacity no greater than required for heating the heating element, and is closed only in a heating-up phase of the battery cell and open under normal operation of the battery cell.

2. The heatable battery as claimed in claim 1, wherein the heating element is arranged between the terminal for applying the voltage potential to the heating element and the one of the anode terminal and the cathode terminal.

3. The heatable battery as claimed in claim 1, wherein the controllable switch is a MOSFET switch or a relay for purpose of current control.

4. The heatable battery as claimed in claim 1, wherein the battery cell is heated in an on state of the controllable switch of the battery cell.

5. The heatable battery as claimed in claim 1, further comprising:
   at least one further battery cell,
   wherein the at least one further battery cell has an anode and a cathode, an anode terminal, which is connected to the anode, and a cathode terminal, which is connected to the cathode, a heating element and a terminal for applying a voltage potential to the heating element,
   wherein the at least one further battery cell has a controllable switch, which is arranged between the terminal for applying the voltage potential to the heating element and one of the anode terminal and the cathode terminal of the at least one further battery cell,
   wherein the heating element of the at least one further battery cell is connected to the other of the anode terminal and the cathode terminal of the at least one further battery cell, and
   wherein one of the anode terminal and the cathode terminal of the at least one further battery cell is connected to the other of the anode terminal and the cathode terminal of the battery cell.

6. The heatable battery as claimed in claim 5, wherein the anode terminal, the cathode terminal, and the terminal for applying the voltage potential to the heating element and the controllable switch of the battery cell are arranged on an outer surface of a housing of the battery cell, and
   the anode terminal, the cathode terminal, and the terminal for applying the voltage potential to the heating element and the controllable switch of the at least one further battery cell are arranged on an outer surface of a housing of the at least one further battery cell.

7. The heatable battery as claimed in claim 1, further comprising:
   at least one further battery cell,
   wherein the at least one further battery cell has an anode, a cathode, an anode terminal, which is connected to the anode, a cathode terminal, which is connected to the cathode, a heating element, a first terminal for applying a first voltage potential to the heating element and a second terminal for applying a second voltage potential to the heating element, wherein the battery cell has a further terminal for applying a further voltage potential to the heating element of the battery cell, wherein the further terminal for applying the further voltage potential to the heating element of the battery cell is connected to the first terminal for applying the first voltage potential to the heating element of the at least one further battery cell, wherein the heating element is connected to one of the anode terminal and the cathode terminal of the at least one further battery cell, and wherein the other of the cathode terminal and the anode terminal of the battery cell is connected to one of the anode terminal and the cathode terminal of the at least one further battery cell.

8. The heatable battery as claimed in claim 7, wherein the anode terminal and the cathode terminal and the terminal for applying the voltage potential to the heating element and the further terminal for applying the further voltage potential to the heating element and the controllable switch of the battery cell are arranged on an outer surface of the housing of the battery cell, and the anode terminal and the cathode terminal and the first terminal for applying the first voltage potential to the heating element and the second terminal for applying the second voltage potential to the heating element and the controllable switch of the at least one further battery cell are arranged on an outer surface of the housing of the at least one further battery cell.

9. The heatable battery as claimed in claim 1, wherein the terminal for applying the voltage potential to the heating element is configured as the housing of the battery cell, and the heating element of the battery cell and the controllable switch are electrically connected to one another by way of the housing of the battery cell.

10. The heatable battery as claimed in claim 1, wherein the heating element is a surface resistor, which is arranged on a surface of the anode or the cathode of the battery cell.

\* \* \* \* \*